United States Patent
Harada et al.

(10) Patent No.: US 12,497,035 B2
(45) Date of Patent: Dec. 16, 2025

(54) VEHICLE TRAVELING CONTROL APPARATUS

(71) Applicant: SUBARU CORPORATION, Tokyo (JP)

(72) Inventors: Reo Harada, Tokyo (JP); Hiroaki Kuramochi, Tokyo (JP); Seiya Sato, Tokyo (JP); Hiroki Maniwa, Tokyo (JP); Wataru Munemura, Tokyo (JP); Shigeki Mukai, Tokyo (JP); Kazuyuki Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 183 days.

(21) Appl. No.: 18/225,327

(22) Filed: Jul. 24, 2023

(65) Prior Publication Data

US 2024/0034315 A1 Feb. 1, 2024

(30) Foreign Application Priority Data

Aug. 1, 2022 (JP) .................................. 2022-122580

(51) Int. Cl.
*B60W 30/09* (2012.01)
*B60W 30/095* (2012.01)
(Continued)

(52) U.S. Cl.
CPC ........ *B60W 30/0956* (2013.01); *B60W 30/09* (2013.01); *B60W 30/165* (2013.01);
(Continued)

(58) Field of Classification Search
CPC ............ B60W 30/0956; B60W 30/09; B60W 30/165; B60W 2420/403; B60W 2554/80;
(Continued)

(56) References Cited

U.S. PATENT DOCUMENTS 9,349,293 B2 * 5/2016 Beaurepaire ........... G08G 1/166
10,503,245 B2 * 12/2019 Rothkopf ........... G02B 27/0179
(Continued)

FOREIGN PATENT DOCUMENTS

| JP | 2020152222 A | * | 9/2020 | ............... B62D 6/04 |
| JP | 2021-11152 A | | 2/2021 | |
| JP | 2021011152 A | * | 2/2021 | ............. B60W 40/02 |

OTHER PUBLICATIONS

Kadali, B. Raghuram, and P. Vedagiri. "Modelling pedestrian road crossing behaviour under mixed traffic condition." European transport 55.3 (2013): 1-17. (Year: 2013).*
(Continued)

*Primary Examiner* — Angelina M Shudy
(74) *Attorney, Agent, or Firm* — TROUTMAN PEPPER LOCKE LLP (57) ABSTRACT

A surrounding environment around a vehicle is recognized and surrounding environment information is acquired. Traveling control is performed on the vehicle based on the acquired surrounding environment information. When an obstacle expected to hinder traveling of the vehicle is recognized ahead of the vehicle and other vehicles traveling ahead of the vehicle are recognized in an adjacent lane adjacent to a traveling lane where the vehicle is traveling, a movement amount of the obstacle moved due to an effect of a first other vehicle among the other vehicles that travels at a position near the obstacle is detected. An estimated movement amount of the obstacle moved due to an effect of a second other vehicle among the other vehicles that follows the first other vehicle is calculated based on the detected movement amount. The traveling control is performed on the vehicle based on the estimated movement amount.

19 Claims, 4 Drawing Sheets

(51) Int. Cl.
*B60W 30/165* (2020.01)
*G06V 20/58* (2022.01)

(52) U.S. Cl.
CPC ....... *G06V 20/58* (2022.01); *B60W 2420/403* (2013.01); *B60W 2554/80* (2020.02)

(58) Field of Classification Search
CPC . B60W 2554/4041; B60W 2554/4042; B60W 2554/4045; B60W 2554/4049; B60W 60/0027; G06V 20/58; G06V 20/588
See application file for complete search history.

(56) References Cited

U.S. PATENT DOCUMENTS

| | | | | |
|---|---|---|---|---|
| 11,008,002 | B2* | 5/2021 | Toda | B60W 10/06 |
| 11,279,354 | B2* | 3/2022 | Kito | B60W 30/18163 |
| 11,433,922 | B1* | 9/2022 | Van Heukelom | G05D 1/0221 |
| 11,747,806 | B1* | 9/2023 | Wootton | G08G 1/161 701/28 |
| 11,955,001 | B2* | 4/2024 | D'Andre | G08G 1/012 |
| 12,071,127 | B2* | 8/2024 | Tam | G05D 1/0223 |
| 2010/0214085 | A1* | 8/2010 | Avery | G08G 1/161 340/435 |
| 2011/0140919 | A1* | 6/2011 | Hara | B60Q 1/507 340/907 |
| 2011/0210866 | A1* | 9/2011 | David | G08G 1/166 340/901 |
| 2012/0133497 | A1* | 5/2012 | Sasaki | G06V 20/58 340/425.5 |
| 2014/0324286 | A1* | 10/2014 | Tsuchida | B60W 30/09 701/36 |
| 2015/0054920 | A1* | 2/2015 | Fukata | G06V 20/58 348/46 |
| 2015/0057914 | A1* | 2/2015 | Hiramatsu | G08G 1/164 701/117 |
| 2015/0228195 | A1* | 8/2015 | Beaurepaire | B60Q 1/547 340/907 |
| 2016/0101779 | A1* | 4/2016 | Katoh | G08G 1/166 340/435 |
| 2016/0114800 | A1* | 4/2016 | Shimizu | B60W 30/18027 701/70 |
| 2016/0176399 | A1* | 6/2016 | Takagi | B60W 30/18154 701/301 |
| 2018/0284785 | A1* | 10/2018 | Berntorp | G08G 1/166 |
| 2018/0292834 | A1* | 10/2018 | Kindo | G01C 21/3415 |
| 2019/0039614 | A1* | 2/2019 | Nagata | B60W 10/20 |
| 2019/0088136 | A1* | 3/2019 | Nagata | G08G 1/163 |
| 2019/0118804 | A1* | 4/2019 | Toda | B62D 15/0265 |
| 2019/0258251 | A1* | 8/2019 | Ditty | G05D 1/0274 |
| 2020/0020226 | A1* | 1/2020 | Stenneth | G06V 20/597 |
| 2020/0023842 | A1* | 1/2020 | Gutierrez | G06V 20/58 |
| 2020/0139981 | A1* | 5/2020 | Schwindt | G05D 1/0238 |
| 2020/0156338 | A1* | 5/2020 | De Boer | B29D 30/44 |
| 2020/0204280 | A1* | 6/2020 | Thagadur Shivappa | G01S 19/48 |
| 2020/0307569 | A1* | 10/2020 | Yasui | B60W 30/0956 |
| 2021/0157325 | A1* | 5/2021 | Beller | B60W 60/001 |
| 2021/0335131 | A1* | 10/2021 | Ishikawa | G06N 3/04 |
| 2021/0347378 | A1* | 11/2021 | Nabatchian | G06V 20/56 |
| 2022/0017122 | A1* | 1/2022 | Malla | G06N 3/049 |
| 2022/0176952 | A1* | 6/2022 | Nanri | B60W 30/0956 |
| 2022/0234577 | A1* | 7/2022 | Baba | G06V 20/58 |
| 2023/0009479 | A1* | 1/2023 | Suzuki | G06V 10/26 |
| 2023/0039935 | A1* | 2/2023 | Yu | G06V 20/56 |
| 2023/0227024 | A1* | 7/2023 | Munemura | G06V 20/58 701/26 |
| 2023/0311866 | A1* | 10/2023 | Ishikawa | B60W 30/0956 |
| 2023/0322208 | A1* | 10/2023 | Rojas | B60W 50/085 701/41 |
| 2024/0025412 | A1* | 1/2024 | Zhang | B60W 40/02 |
| 2024/0089903 | A1* | 3/2024 | Monteuuis | H04W 12/63 |
| 2024/0185437 | A1* | 6/2024 | Kannaiah | G06V 10/242 |
| 2024/0199083 | A1* | 6/2024 | Chang | B60W 50/0097 |
| 2025/0065917 | A1* | 2/2025 | Cui | B60W 30/09 |

OTHER PUBLICATIONS

JP-2020152222-A machine translation (Year: 2020).*
JP-2021011152-A machine translation (Year: 2021).*

* cited by examiner

VEHICLE TRAVELING CONTROL APPARATUS

CROSS-REFERENCE TO RELATED APPLICATION

The present application claims priority from Japanese Patent Application No. 2022-122580 filed on Aug. 1, 2022, the entire contents of which are hereby incorporated by reference.

BACKGROUND

The disclosure relates to a vehicle traveling control apparatus that performs traveling control for avoiding collision with a forward obstacle based on surrounding environment information acquired by using a surrounding environment recognition device such as an on-board camera device.

In the field of vehicles such as automobiles, autonomous driving control technologies have been developed to cause the vehicles to autonomously travel without driving operations of drivers who drive the vehicles. Various traveling control apparatuses using the autonomous driving control technologies have been proposed and put into practical use to perform various types of traveling control for assisting driving operations of drivers.

Related-art vehicle traveling control apparatuses use sensing devices such as an on-board camera device and an on-board radar device as a surrounding environment recognition device that recognizes the surrounding environment around a vehicle and acquires the surrounding environment as surrounding environment information. The on-board camera device recognizes the surrounding environment around the vehicle based on acquired image data. The on-board radar device recognizes the surrounding environment around the vehicle by outputting radio waves to the surroundings of the vehicle, receiving the reflected radio waves from objects, and analyzing the received radio waves.

Each related-art vehicle traveling control apparatus causes the vehicle to travel while recognizing the surrounding environment around the vehicle by using the sensing devices. For example, when an obstacle that may hinder the traveling of the vehicle (for example, a fallen object or an airborne object) is recognized on or near a traveling path ahead of the vehicle, traveling control is performed for emergency avoidance control including braking control, steering control, and throttle control to prevent collision between the vehicle and the obstacle. Thus, the vehicle can continue to travel safely.

This type of traveling control technology, that is, the technology for achieving the emergency avoidance control for avoiding collision with an obstacle has variously been proposed in, for example, Japanese Unexamined Patent Application Publication (JP-A) No. 2021-11152. In this technology, the moving state of an obstacle recognized on or near a traveling path ahead of the vehicle is predicted when the obstacle is moved by an aerodynamic effect from another vehicle (for example, a vehicle traveling side by side or an oncoming vehicle) traveling on an adjacent lane ahead of the vehicle.

The vehicle traveling control apparatus disclosed in JP-A No. 2021-11152 recognizes an object that may be moved by a disturbance factor (for example, a surrounding wind condition or behavior of a surrounding vehicle) in the surrounding environment information, recognizes the moving state of the recognized object due to the disturbance factor, predicts a future moving state of the object based on the recognized disturbance factor, and performs vehicle traveling control based on recognition and prediction results.

SUMMARY

An aspect of the disclosure provides a vehicle traveling control apparatus to be applied to a vehicle. The vehicle traveling control apparatus includes a surrounding environment recognition device and a traveling control unit. The surrounding environment recognition device is configured to recognize a surrounding environment around the vehicle and acquire surrounding environment information. The traveling control unit is configured to perform traveling control on the vehicle based on the surrounding environment information acquired by the surrounding environment recognition device on the vehicle. The surrounding environment recognition device includes an obstacle movement amount detector and an obstacle movement amount estimator. The obstacle movement amount detector is configured to, when an obstacle expected to hinder traveling of the vehicle is recognized ahead of the vehicle and other vehicles traveling ahead of the vehicle are recognized in an adjacent lane that is adjacent to a traveling lane where the vehicle is traveling, detect a movement amount of the obstacle that is moved due to an effect of a first other vehicle among the other vehicles that travels at a position near the obstacle among the multiple other vehicles. The obstacle movement amount estimator is configured to calculate, based on the detected movement amount, an estimated movement amount of the obstacle that is moved due to an effect of a second other vehicle among the other vehicles that follows the first other vehicle. The traveling control unit is configured to perform the traveling control on the vehicle based on the estimated movement amount.

An aspect of the disclosure provides a vehicle traveling control apparatus to be applied to a vehicle. The vehicle traveling control apparatus includes components and circuitry. The components include a sensor or a camera. The circuitry is configured to recognize a surrounding environment around the vehicle and acquire surrounding environment information together with the components. The circuitry is configured to perform traveling control on the vehicle based on the acquired surrounding environment information. The circuitry is configured to, when an obstacle expected to hinder traveling of the vehicle is recognized ahead of the vehicle and multiple other vehicles traveling ahead of the vehicle are recognized in an adjacent lane that is adjacent to a traveling lane where the vehicle is traveling, detect a movement amount of the obstacle that is moved due to an effect of a first other vehicle traveling at a position near the obstacle among the multiple other vehicles. The circuitry is configured to calculate, based on the detected movement amount, an estimated movement amount of the obstacle that is moved due to an effect of a second other vehicle that follows the first other vehicle among the multiple other vehicles. The circuitry is configured to perform the traveling control on the vehicle based on the estimated movement amount.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

It is generally known that the behavior of a movable object variously changes depending on the properties of the object (for example, form, size, and weight) and a disturbance factor on each occasion.

The related-art vehicle traveling control apparatus disclosed in JP-A No. 2021-11152 has a problem in that the moving state of the recognized movable object is difficult to predict with high accuracy. If the moving state of the object cannot be predicted with high accuracy, inappropriate emergency avoidance control may be performed. In this case, the driver may have discomfort.

The related-art vehicle traveling control apparatus disclosed in JP-A No. 2021-11152 predicts the onward moving state after recognizing the moving state of the recognized object. In the case where the onward moving state is predicted after the moving state of the recognized object has been recognized, a problem arises in that the time margin to perform the emergency avoidance control decreases. In this case, excessive emergency avoidance control may be performed. As a result, the driver may have discomfort.

It is desirable to provide a vehicle traveling control apparatus that can start obstacle avoidance control earlier by predicting, with high accuracy, the movement amount (for example, a movement distance and a movement direction) of an obstacle recognized ahead of a traveling vehicle, thereby suppressing inappropriate or excessive emergency avoidance control and reducing the possibility of collision between the vehicle and the obstacle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The description of the configuration and operation of this embodiment is directed to a road system of left-hand traffic in which the traveling section of vehicles is a left side in a traveling direction. The configuration and operation of this embodiment are similarly applicable to a road system of right-hand traffic by switching right and left.

Figure 1:
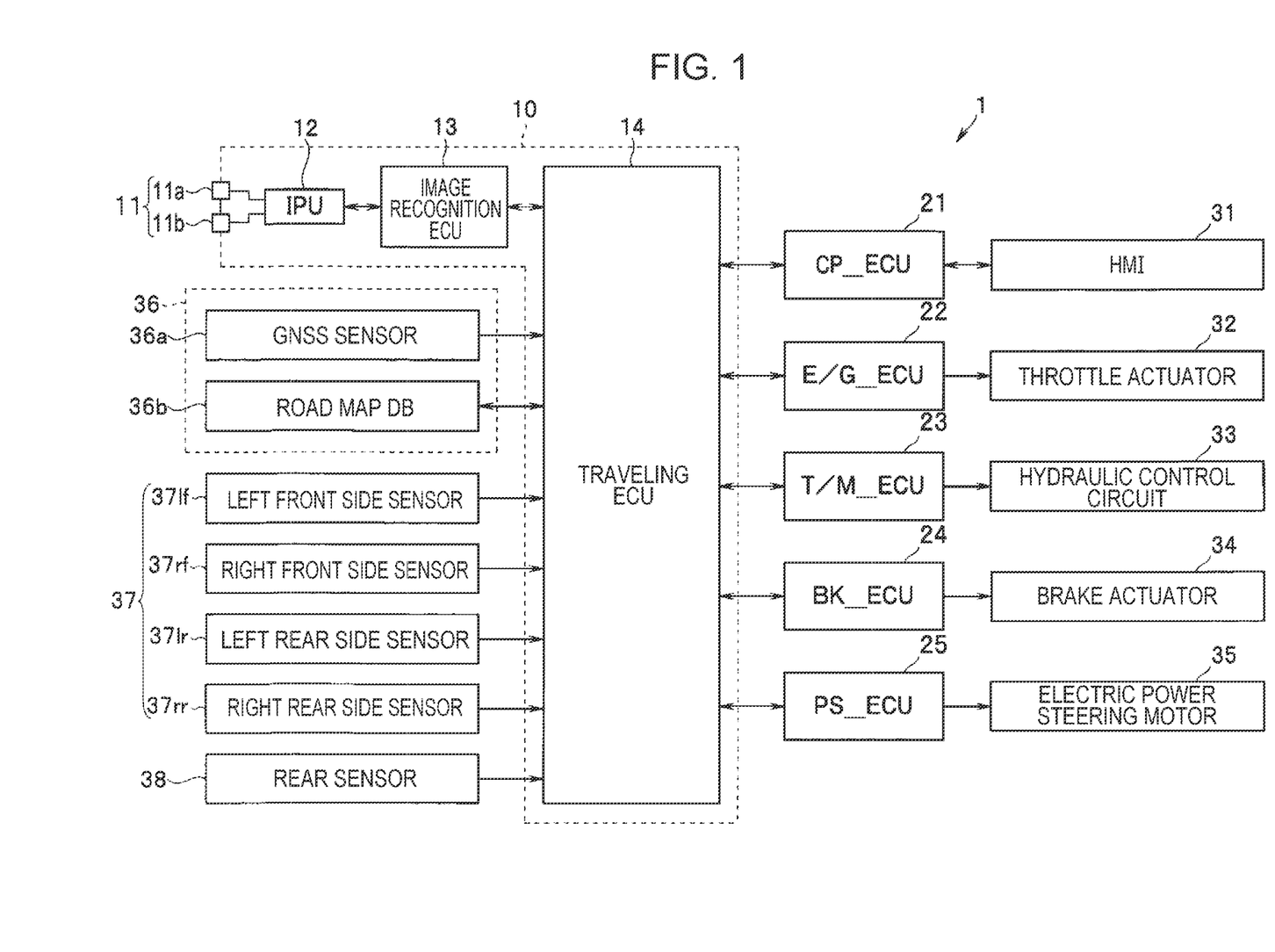
FIG. 1 is a block diagram illustrating a schematic configuration of a traveling control apparatus according to an embodiment of the disclosure.

A schematic configuration of a vehicle traveling control apparatus according to the embodiment of the disclosure is described below with reference to FIG. 1. FIG. 1 is a block diagram illustrating a schematic configuration of the traveling control apparatus according to the embodiment of the disclosure.

As illustrated in FIG. 1, a traveling control apparatus 1 of this embodiment basically has a configuration substantially similar to those of related-art vehicle traveling control apparatuses of the same type. Therefore, the following description is overall description of the vehicle traveling control apparatus 1 of this embodiment and detailed description is omitted.

The traveling control apparatus 1 of this embodiment includes a camera unit 10 fixed to an upper central part of a front area in a cabin of a vehicle including the traveling control apparatus 1 (hereinafter referred to simply as "vehicle"). In one embodiment, the camera unit 10 may serve as an on-board camera device.

The camera unit 10 includes a stereo camera 11, an image processing unit (IPU) 12, an image recognition unit (image recognition ECU) 13, and a traveling control unit (traveling ECU) 14.

The stereo camera 11 is a sensing device that recognizes a surrounding environment around the vehicle and acquires the surrounding environment as surrounding environment information. The stereo camera 11 includes a main camera 11a and a subcamera 11b. For example, the main camera 11a and the subcamera 11b are disposed in the cabin of the vehicle at bilaterally symmetrical positions across the center in a vehicle width direction to face a forward side (in the traveling direction).

For example, the main camera 11a and the subcamera 11b each include a CMOS image sensor, and generate a stereoscopic image by acquiring two images of a surrounding environment in an external forward area within a predetermined range from different viewpoints in every predetermined synchronous imaging period. The generated stereoscopic image data is output to the IPU 12 as surrounding environment image data (image data indicating the surrounding environment during traveling of the vehicle).

The IPU 12 receives the surrounding environment image data obtained by the stereo camera 11, and performs predetermined image processing for the received image data to detect edges of various target objects such as objects (moving object and stationary object) shown in the image and lane lines on a road surface. Thus, the IPU 12 recognizes the objects and lane lines around the vehicle. The IPU 12 acquires distance information from positional deviation amounts of corresponding edges in the right and left images, and generates image information including the distance information (distance image information). The generated distance image information is output to the image recognition ECU 13.

The image recognition ECU 13 obtains, based on the distance image information received from the IPU 12, a road curvature [l/m] between right and left lane lines of a road where the vehicle is traveling (vehicle traveling road) and a width between the right and left lane lines (lane width). Various methods are known to obtain the road curvature and the lane width. For example, the image recognition ECU 13 obtains the road curvature in such a manner that right and left lane lines are recognized by binarization using a difference in brightness levels based on surrounding environment information and the curvatures of the right and left lane lines are obtained for each predetermined section by using a curve approximation expression based on the least-square method. The image recognition ECU 13 calculates the lane width from a difference in the curvatures of the right and left lane lines.

The image recognition ECU 13 calculates, based on the curvatures of the right and left lane lines and the lane width, a vehicle lateral position deviation that is a distance from a lane center to the center of the vehicle in the vehicle width direction.

The image recognition ECU 13 performs predetermined pattern matching for the distance image information to recognize three-dimensional objects such as stationary objects including guardrails along the road and curbstones and surrounding moving objects (including, for example, surrounding other vehicles, bicycles, and pedestrians). Examples of the other vehicles that are the moving objects include another vehicle traveling in an adjacent lane (vehicle traveling side by side or oncoming vehicle), a preceding other vehicle, and a succeeding other vehicle.

In the recognition of three-dimensional objects, the image recognition ECU 13 recognizes, for example, types of the three-dimensional objects, heights of the three-dimensional objects, distances from the three-dimensional objects, speeds of the three-dimensional objects, relative speeds between the three-dimensional objects and the vehicle, and relative distances between the three-dimensional objects (for example, a lateral distance between a roadside curbstone and a lane line nearby). In a case where the three-dimensional object is another vehicle, the type (large-size vehicle, medium-size vehicle, ordinary-size vehicle, light vehicle, or two-wheeled vehicle) and size of the vehicle are roughly recognized.

Among the recognized three-dimensional objects, the image recognition ECU 13 recognizes an object (for example, a fallen object or an airborne object) temporarily present on a road on or near a traveling path ahead of the vehicle as an obstacle that may hinder the traveling of the vehicle. In this case, the image recognition ECU 13 also recognizes, for example, a relative distance between the recognized obstacle and a surrounding three-dimensional object (for example, the vehicle or a surrounding other vehicle).

In a case where the obstacle is moving, the movement amount (for example, a movement distance and a movement direction) is also recognized. In one embodiment, the image recognition ECU 13 may serve as an "obstacle movement amount detector" configured to detect a movement amount (for example, a movement distance and a movement direction) of an obstacle.

In one embodiment, the image recognition ECU 13 may serve as an "obstacle movement amount estimator" configured to calculate, based on the movement amount detected by the obstacle movement amount detector, an estimated movement amount of an obstacle F moved by an external factor such as another vehicle. Details will be described later.

Various types of information recognized by the image recognition ECU 13 are output to the traveling ECU 14 as first surrounding environment information.

In one embodiment, the image recognition ECU 13 of the traveling control apparatus 1 may serve as a "surrounding environment recognition device" configured to recognize a first surrounding environment around the vehicle in cooperation with the stereo camera 11 and the IPU 12.

The traveling ECU 14 is a main control unit that centrally controls the traveling control apparatus 1. Various sub-control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the traveling ECU 14 via an internal communication network such as a controller area network (CAN).

Various sensors such as a locator unit 36, on-board radar devices 37, and a rear sensor 38 are coupled to the traveling ECU 14.

A human-machine interface (HMI) 31 disposed near a driver's seat is coupled to the CP_ECU 21. For example, the HMI 31 includes a switch for giving instructions to perform various types of drive assist control, a mode selection switch for switching driving modes, a steering touch sensor that detects a steering wheel holding state of a driver, a driver monitoring system (DMS) that performs facial authentication of the driver and detects a line of sight, a touch panel display, a combination of meters, and a loudspeaker. In one embodiment, the touch panel display may serve as a display panel.

In response to a control signal from the traveling ECU 14, the CP_ECU 21 notifies the driver as appropriate by display and sound through the HMI 31 about various types of information related to, for example, various alerts for a preceding vehicle, the status of the drive assist control, and the surrounding environment around the vehicle. The CP_ECU 21 outputs, to the traveling ECU 14, various types of information input by the driver through the HMI 31, such as ON/OFF operations on various types of drive assist control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls drive of the throttle actuator 32 based on, for example, a control signal from the traveling ECU 14 or detection signals from various sensors. Thus, the E/G_ECU 22 adjusts the intake amount of an engine to generate desired engine power. The E/G_ECU 22 outputs, to the traveling ECU 14, signals of an accelerator operation amount and the like detected by various sensors.

A hydraulic control circuit 33 is coupled to an output side of the T/M_ECU 23. Various sensors such as a shift position sensor (not illustrated) are coupled to an input side of the T/M_ECU 23. The T/M_ECU 23 performs hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position and the like detected by various sensors.

A brake actuator 34 for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 controls drive of the brake actuator 34 based on a control signal from the traveling ECU 14 or detection signals from various sensors. Thus, the BK_ECU 24 generates, for the wheels as appropriate, braking forces for forcible braking control and yaw rate control on the vehicle. The BK_ECU 24 outputs, to the traveling ECU 14, signals of a brake operation status, a yaw rate, a longitudinal acceleration, a vehicle speed, and the like detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls drive of the electric power steering motor 35 based on a control signal from the traveling ECU 14 or detection signals from various sensors. Thus, the PS_ECU 25 generates the steering torque for the steering mechanism. The PS_ECU 25 outputs, to the traveling ECU 14, signals of a steering torque, a steering angle, and the like detected by various sensors.

The locator unit 36 includes a GNSS sensor 36a and a high-accuracy road map database (road map DB) 36b.

The GNSS sensor 36a measures the position (latitude, longitude, and altitude) of the vehicle by receiving positioning signals from positioning satellites.

The road map DB 36b is a large-capacity storage medium such as an HDD or an SSD, and stores high-accuracy road map information (dynamic map). For example, the road map DB 36b stores lane width data, lane center position coordinate data, lane azimuth angle data, and speed limits as lane data for use in autonomous driving. The stored lane data includes pieces of data for several-meter intervals in each lane on the road map. The road map DB stores information on various facilities and parking lots. Based on, for example, a request signal from the traveling ECU 14, the road map DB 36b outputs road map information in a set range around the vehicle position measured by the GNSS sensor 36a to the traveling ECU 14 as third surrounding environment information.

In one embodiment, the road map DB 36b of the traveling control apparatus 1 may serve as a "surrounding environment recognition device" configured to recognize a third surrounding environment around the vehicle in cooperation with the GNSS sensor 36a.

The on-board radar devices 37 include sensors (right front side sensor 37rf, left front side sensor 371f, right rear side sensor 37rr, and left rear side sensor 371r). Examples of the sensors of the on-board radar devices 37 include millimeter wave radars.

Each millimeter wave radar detects a three-dimensional object such as a pedestrian or a surrounding other vehicle and a structure (three-dimensional object such as a curbstone, a guardrail, a wall of a building, or a plant) along a roadside (for example, an end at a road shoulder) by outputting radio waves and analyzing the reflected radio waves from the objects. Each millimeter wave radar also detects a three-dimensional obstacle on a road. For example, each millimeter wave radar detects a width of the three-dimensional object, a position of a representative point of the three-dimensional object (position and distance relative to the vehicle), and a relative speed as specific information related to the three-dimensional object. Each millimeter wave radar also detects a movement amount (for example, a movement distance and a movement direction) of the three-dimensional obstacle moving on the road and a separation distance between the obstacle and another three-dimensional object (for example, a surrounding other vehicle).

For example, the right front side sensor 37rf and the left front side sensor 371f are disposed on right and left sides of a front bumper. The right front side sensor 37rf and the left front side sensor 371f detect, as second surrounding environment information, three-dimensional objects in right and left obliquely forward and side areas around the vehicle. Those areas are difficult to recognize from an image captured by the stereo camera 11.

For example, the right rear side sensor 37rr and the left rear side sensor 371r are disposed on right and left sides of a rear bumper. The right rear side sensor 37rr and the left rear side sensor 371r detect, as the second surrounding environment information, three-dimensional objects in right and left obliquely rearward and side areas around the vehicle. Those areas are difficult to recognize by the right front side sensor 37rf and the left front side sensor 371f.

In one embodiment, the on-board radar devices 37 (right front side sensor 37rf, left front side sensor 371f, right rear side sensor 37rr, and left rear side sensor 371r) of the traveling control apparatus 1 may serve as a "surrounding environment recognition device" configured to recognize a second surrounding environment around the vehicle. The pieces of information acquired by the sensors 37rf, 371f, 37rr, and 371r are sent to the image recognition ECU 13.

Examples of the rear sensor 38 include a sonar device. For example, the rear sensor 38 is disposed on the rear bumper. The rear sensor 38 detects three-dimensional objects in a rearward area behind the vehicle as fourth surrounding environment information. This area is difficult to recognize by the right rear side sensor 37rr and the left rear side sensor 371r.

In one embodiment, the rear sensor 38 of the traveling control apparatus 1 may serve as a "surrounding environment recognition device" configured to recognize a fourth surrounding environment around the vehicle.

Coordinates of the external targets in the first surrounding environment information recognized by the camera unit 10 including the image recognition ECU 13, the third surrounding environment information recognized by the locator unit 36, the second surrounding environment information recognized by the on-board radar devices 37 (right front side sensor 37rf, left front side sensor 371f, right rear side sensor 37rr, and left rear side sensor 371r), and the fourth surrounding environment information recognized by the rear sensor 38 are converted by the traveling ECU 14 into coordinates in a three-dimensional coordinate system having its origin at the center of the vehicle.

The traveling ECU 14 has driving modes such as a manual driving mode, a first traveling control mode, a second traveling control mode, and a limp home mode. The traveling ECU 14 can selectively switch the driving modes based on, for example, a status of operation on the mode selection switch of the HMI 31.

The manual driving mode is a driving mode in which the driver is assumed to hold the steering wheel. In this driving mode, the vehicle travels by driving operations of the driver, such as a steering operation, an accelerator operation, and a brake operation.

The first traveling control mode is also a driving mode in which the driver is assumed to hold the steering wheel. That is, the first traveling control mode is a so-called semi-autonomous driving mode or drive assist mode in which the vehicle travels along a target traveling route by combining, for example, adaptive cruise control (ACC), active lane keep centering (ALKC) control, and active lane keep bouncing control as appropriate through control of, for example, the E/G_ECU 22, the BK_ECU 24, and the PS_ECU 25 while reflecting the driving operations of the driver.

The adaptive cruise control (ACC) is basically performed based on the first surrounding environment information input from the image recognition ECU 13. For example, the adaptive cruise control (ACC) is performed based on preceding vehicle information in the first surrounding environment information from the image recognition ECU 13.

The active lane keep centering control and the active lane keep bouncing control are basically performed based on the first surrounding environment information and the third surrounding environment information input from one or more of the image recognition ECU 13 and the locator unit 36. For example, the active lane keep centering control and the active lane keep bouncing control are performed based on lane line information in the third surrounding environment information from the image recognition ECU 13 or the locator unit 36.

The second traveling control mode is an autonomous driving mode that realizes a so-called hands-off function in which the vehicle travels along a target route (route map information) by combining, for example, the adaptive cruise control, the active lane keep centering control, and the active lane keep bouncing control as appropriate through control of, for example, the E/G_ECU 22, the BK_ECU 24, and the PS_ECU 25 without the steering wheel holding by the driver, the accelerator operation, and the brake operation.

In the limp home mode, the vehicle is automatically stopped, for example, at a side strip when the vehicle traveling in the second traveling control mode cannot continue the traveling in this mode and the driver cannot take over the driving operation (that is, the mode cannot be switched to the manual driving mode or the first traveling control mode).

In each of the driving modes described above, the traveling ECU 14 determines whether to perform obstacle avoidance control involving autonomous emergency braking (AEB: collision damage reduction braking) control and emergency steering control in response to recognition of an obstacle having a strong possibility of hindering the traveling of the vehicle (such as a preceding vehicle or a fallen object on a vehicle traveling road), and performs predetermined control as appropriate.

All or part of the locator unit 36, the image recognition ECU 13, the traveling ECU 14, the CP_ECU 21, the E/G_ECU 22, the T/M_ECU 23, the BK_ECU 24, and the PS_ECU 25 are/is a processor including hardware.

For example, the processor is constituted by known components and their peripheral devices including a central processing unit (CPU), a random access memory (RAM), a read only memory (ROM), a non-volatile memory, a non-volatile storage, and a non-transitory computer readable medium.

The ROM, the non-volatile memory, and the non-volatile storage prestore software programs to be executed by the CPU and fixed data such as data tables. The CPU reads the software programs stored in the ROM and the like and executes the software programs by loading the software programs in the RAM. The software programs implement the functions of the components and units (13, 14, 21 to 25, 36) by referring to various types of data as appropriate.

The processor may be implemented by a semiconductor chip such as a field programmable gate array (FPGA). The components and units (13, 14, 21 to 25, 36) may be implemented by electronic circuits.

The software programs may entirely or partly be recorded as computer program products in a non-transitory computer readable medium such as a portable sheet medium typified by a flexible disk, a CD-ROM, or a DVD-ROM, a card memory, a hard disk drive (HDD), or a solid state drive (SSD).

In one embodiment, a monocular camera may serve as a "surrounding environment recognition device" in place of (or in addition to) the stereo camera 11 in the camera unit 10. In one embodiment, a light detection and ranging (LiDAR) sensor may serve as the surrounding environment recognition device in place of (or in addition to) the on-board radar devices 37.

Figure 2:
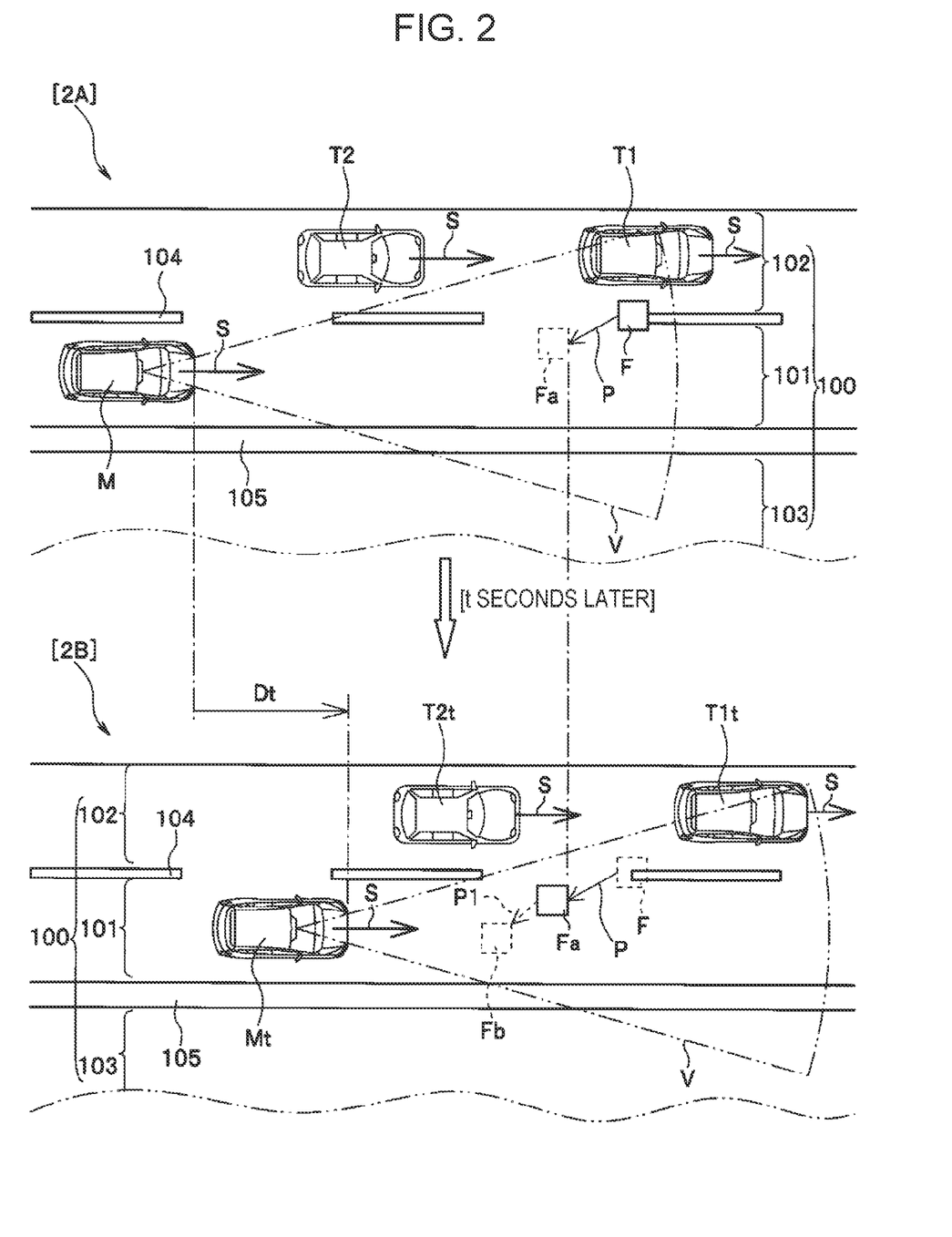
FIG. 2 is a conceptual diagram illustrating a first situation in which obstacle avoidance control is performed by the traveling control apparatus according to the embodiment of the disclosure.
Figure 3:
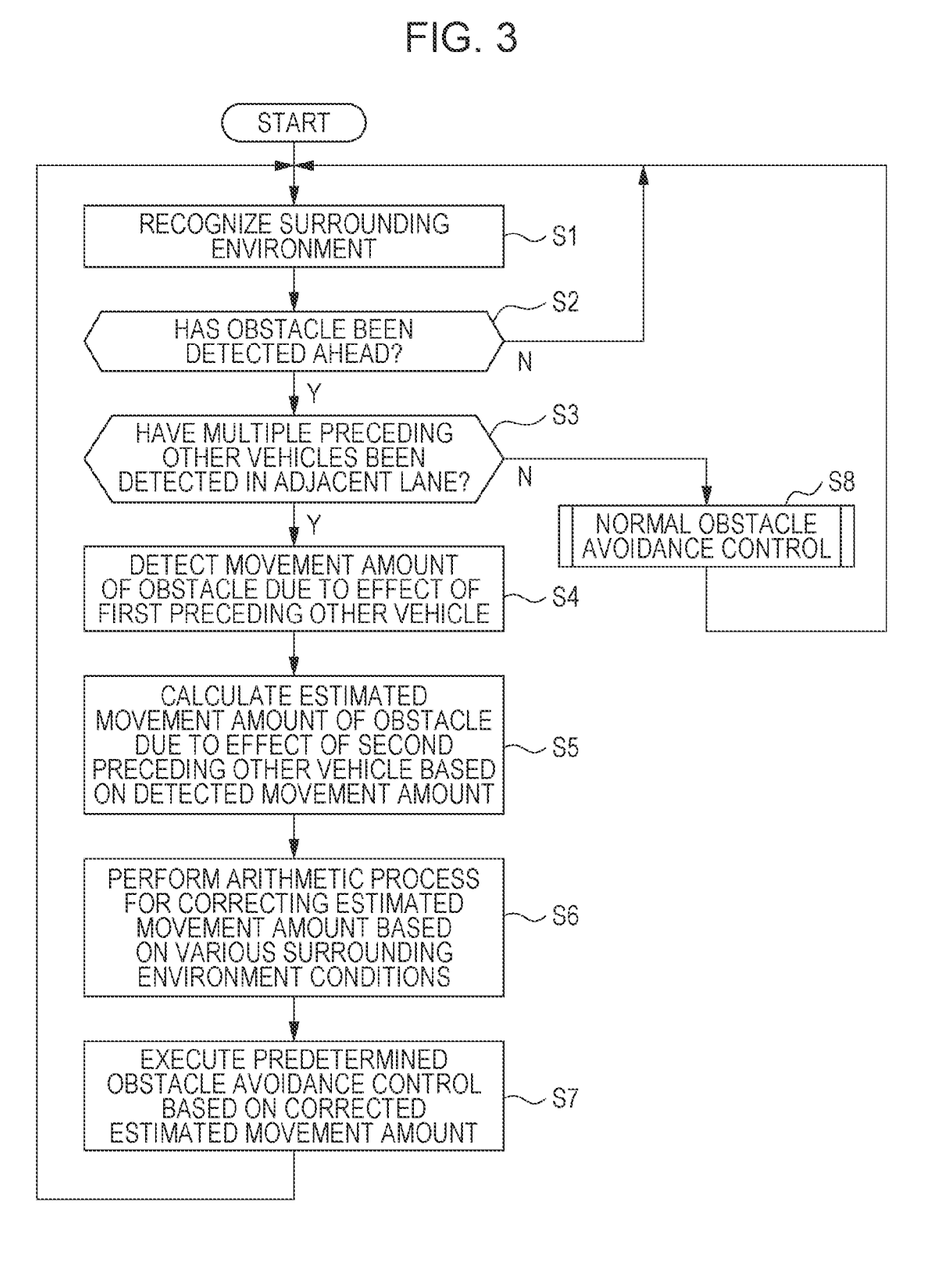
FIG. 3 is a flowchart illustrating a flow of the obstacle avoidance control to be performed by the traveling control apparatus according to the embodiment of the disclosure.

Operations of the traveling control apparatus 1 of this embodiment are described below. FIGS. 2 and 3 are diagrams illustrating the operations of the traveling control apparatus according to the embodiment of the disclosure. FIG. 2 is a conceptual diagram illustrating a first situation in which the obstacle avoidance control is performed by the traveling control apparatus of this embodiment. FIG. 3 is a flowchart illustrating a flow of the obstacle avoidance control to be performed by the traveling control apparatus of this embodiment.

Referring to FIG. 2, brief description is made about an example of the first situation in which the obstacle avoidance control is performed by the traveling control apparatus 1 of this embodiment.

The situation of FIG. 2 is a conceptual situation in which a vehicle M including the traveling control apparatus 1 and preceding other vehicles (T1, T2) are traveling in the same direction (arrow S direction) on a road 100 having two lanes on one side.

Reference symbol [2A] in FIG. 2 represents traveling situations and surrounding situations of the vehicles (M, T1, T2) at a certain time. Reference symbol [2B] in FIG. 2 represents traveling situations and surrounding situations of the vehicles (M, T1, T2) after an elapse of a predetermined period (t seconds) from the situation [2A].

In FIG. 2, reference symbol 100 represents a road where the vehicle M and the preceding other vehicles (T1, T2) are traveling. The road 100 has two lanes (101, 102) where the vehicle M and the preceding other vehicles (T1, T2) are traveling, and an oncoming lane 103. In FIG. 2, detailed illustration of the oncoming lane 103 is omitted.

The road 100 has a lane line 104 as a boundary between the two lanes (101, 102), and a median strip or center line 105 as a boundary between the two lanes (101, 102) and the oncoming lane 103.

The lane 101 out of the two lanes is referred to as "first lane". The lane 102 out of the two lanes is referred to as "second lane". The first lane 101 and the second lane 102 adjoin each other.

The vehicle M includes the traveling control apparatus 1 of this embodiment. In the situation of FIG. 2, the vehicle M is traveling in the arrow S direction in the first lane 101. Reference symbol Mt in the situation [2B] of FIG. 2 represents the vehicle after the elapse of the predetermined period (t seconds) from the situation [2A] of FIG. 2.

In FIG. 2, reference symbol V represents a conceptual visual field range (recognition range) of the stereo camera 11 in the camera unit 10 that may serve, in one embodiment, as a "surrounding environment recognition device" in the traveling control apparatus 1 of the vehicle M.

In the situation of FIG. 2, the preceding other vehicles (T1, T2) are traveling ahead of the vehicle M. In this case, the preceding other vehicles (T1, T2) are traveling in the second lane 102 adjacent to the first lane 101 where the vehicle M is traveling.

In the preceding other vehicles (T1, T2), the preceding other vehicle T1 is a first other vehicle (hereinafter referred to as "first preceding other vehicle T1") traveling ahead of the vehicle M and located near the obstacle F described later.

In the preceding other vehicles (T1, T2), the preceding other vehicle T2 is a second other vehicle (hereinafter referred to as "second preceding other vehicle T2") traveling ahead of the vehicle M and behind the first preceding other vehicle T1 and located near the vehicle M.

The traveling directions of the first preceding other vehicle T1 and the second preceding other vehicle T2 are the same as that of the vehicle M (arrow S direction). Reference symbols T1t and T2t in the situation [2B] of FIG. 2 represent the first preceding other vehicle and the second preceding other vehicle after the elapse of the predetermined period (t seconds) from the situation [2A] of FIG. 2.

In the situation of FIG. 2, an object that may hinder the traveling of the vehicle M, the first preceding other vehicle T1, and the second preceding other vehicle T2, that is, an obstacle such as a fallen object or an airborne object (hereinafter referred to simply as "obstacle F") is present ahead of the vehicle M, the first preceding other vehicle T1, and the second preceding other vehicle T2 on the road 100.

In this situation, the traveling control apparatus 1 of this embodiment performs a process in the flowchart of FIG. 3 (obstacle avoidance control).

The vehicle M including the traveling control apparatus 1 of this embodiment is traveling in the first lane 101 of the road 100 as in the situation [2A] of FIG. 2. In Step S1 of FIG. 3, the traveling ECU 14 of the traveling control apparatus 1 of the vehicle M controls the surrounding environment recognition device (in one embodiment, the camera unit 10) to continue the process of recognizing the surrounding environment.

In Step S2, the traveling ECU 14 determines whether the obstacle F is detected on the road 100 ahead of the vehicle M. When the obstacle F is detected on the road 100 ahead of the vehicle M, the process proceeds to Step S3. When the obstacle F is not detected on the road 100 ahead of the vehicle M, the process returns to Step S1.

In Step S3, the traveling ECU 14 determines whether multiple preceding other vehicles (T1, T2) traveling ahead in the same direction as that of the vehicle M are detected ahead of the vehicle M in the second lane 102 adjacent to the first lane 101 where the vehicle M is traveling. When multiple preceding other vehicles (T1, T2) are detected ahead of the vehicle M in the adjacent lane (second lane 102), the process proceeds to Step S4. When multiple preceding other vehicles (T1, T2) are not detected ahead of the vehicle M in the adjacent lane (second lane 102), the process proceeds to Step S8.

When the process proceeds to Step S8 from Step S3, a single preceding other vehicle is present or no preceding other vehicle is present in the adjacent lane (second lane 102). In this case, the traveling ECU 14 performs normal obstacle avoidance control in Step S8.

The normal obstacle avoidance control is known traveling control for recognizing the detected obstacle F as an obstacle that may hinder the traveling of the vehicle M and avoiding collision with the obstacle F. The normal obstacle avoidance control is known traveling control including, for example, braking control, steering control, and throttle control, or control for displaying alert for the driver or notifying the driver about the alert. Since the normal obstacle avoidance control is the known technology, detailed description thereof is omitted.

When the process of Step S8 (normal obstacle avoidance control) is completed, the process returns to the initial step (Step S1) and the subsequent process is repeated.

When multiple preceding other vehicles (T1, T2) are detected ahead of the vehicle M in the adjacent lane (second lane 102) in the process of Step S3 and the process proceeds to Step S4, the traveling ECU 14 detects a movement amount (for example, a movement distance and a movement direction) of the detected obstacle F in Step S4. Then, the process proceeds to Step S5.

In the situation [2A] of FIG. 2, the first preceding other vehicle T1 traveling ahead out of the multiple preceding other vehicles (T1, T2) is expected to pass by the obstacle F while avoiding collision with the obstacle F. At this time, the obstacle F may be moved due to an effect of the first preceding other vehicle T1, such as an air pressure caused during the passage by the obstacle F.

For example, the obstacle F in the situation [2A] of FIG. 2 is moved by a predetermined distance in an arrow P direction in the situation [2A] of FIG. 2 due to the effect of the first preceding other vehicle T1. The situation [2B] of FIG. 2 is a situation after the elapse of the predetermined period (t seconds) from the situation [2A].

That is, in the situation [2B] of FIG. 2 (after the elapse of the predetermined period (t seconds)), the obstacle F is moved to a position Fa from the initial position (position represented by reference symbol F in the situation [2A]).

When the obstacle F is moved by a predetermined movement amount (for example, a movement distance and a movement direction) due to the effect of the first preceding other vehicle T1, the traveling control apparatus 1 of the vehicle M detects the movement amount (for example, the movement distance and the movement direction) of the obstacle F (Step S4).

For example, the movement amount of the obstacle F is represented by a movement direction (direction of the arrow P) and a movement distance (length of the arrow P). The movement amount of the obstacle F can be detected based on a result of recognition by the surrounding environment recognition device (in one embodiment, the camera unit 10). The detected movement amount of the obstacle F is stored in a storage (not illustrated) of the traveling ECU 14.

During the predetermined period (t seconds) in which the situation changes from [2A] to [2B] in FIG. 2, the vehicle M moves in the arrow S direction by a distance indicated by an arrow Dt in FIG. 2. Similarly, the preceding other vehicles (T1, T2) move in the same direction (arrow S direction) by predetermined distances.

As described above, the second preceding other vehicle T2 is following the first preceding other vehicle T1 in the adjacent lane (second lane 102). Therefore, the second preceding other vehicle T2 is approaching the moved obstacle F (at the position Fa).

The second preceding other vehicle T2 is also expected to pass by the moved obstacle F at the position Fa while avoiding collision with the obstacle F. At this time as well, the obstacle F may be moved due to an effect of the second preceding other vehicle T2.

The traveling control apparatus 1 according to the embodiment of the disclosure detects the movement amount of the obstacle F due to the effect of the first preceding other vehicle T1 in Step S4 of FIG. 3, and calculates an estimated movement amount of the obstacle F due to the effect of the second preceding other vehicle T2 based on the detected information in the process of Step S5.

In Step S5 of FIG. 3, the traveling ECU 14 calculates the estimated movement amount of the obstacle F due to the effect of the second preceding other vehicle T2 based on the movement amount detected in the process of Step S4. Then, the process proceeds to Step S6.

The estimated movement amount may be calculated by applying the detected movement amount of the obstacle F due to the effect of the first preceding other vehicle T1 directly as the estimated movement amount of the obstacle F due to the effect of the second preceding other vehicle T2.

However, the movement amount detected in the process of Step S4 (detection result) can easily be presumed to vary depending on, for example, various surrounding environment conditions.

Examples of the various surrounding environment conditions that vary the movement amount of the obstacle F include a vehicle speed of a vehicle passing by the target obstacle F, a separation distance between the obstacle F and the passing vehicle, and a body type of the vehicle (for example, light vehicle, ordinary-size vehicle, medium-size vehicle, or large-size vehicle).

In view of this, the traveling ECU 14 of the traveling control apparatus 1 of this embodiment performs, in Step S6, an arithmetic process for correcting the estimated movement amount of the obstacle F based on the various surrounding environment conditions. For the various surrounding environment condition, the traveling ECU 14 refers to the surrounding environment information (recognition result) acquired by the surrounding environment recognition device (in one embodiment, the camera unit 10).

The correction arithmetic process in Step S6 is performed in consideration of, for example, one or more of conditions including (1) a vehicle speed difference between the first preceding other vehicle T1 and the second preceding other vehicle T2, (2) a difference between the separation distance of the first preceding other vehicle T1 and the obstacle F and the separation distance of the second preceding other vehicle T2 and the obstacle F, and (3) a difference between the body types of the first preceding other vehicle T1 and the second preceding other vehicle T2.

When the estimated movement amount is calculated by the correction arithmetic process, for example, an estimated position (reference symbol Fb) after movement in an arrow P1 direction (dotted line) by a predetermined distance can be estimated as in the situation [2B] of FIG. 2.

In Step S7, the traveling ECU 14 performs the obstacle avoidance control for the estimated position Fb of the obstacle F based on the estimated movement amount corrected by calculation. The obstacle avoidance control is known traveling control including, for example, braking control, steering control, and throttle control, or control for displaying alert for the driver or notifying the driver about the alert.

According to the embodiment described above, the movement amount of the obstacle F due to the effect of the first preceding other vehicle T1 is detected, and the movement amount of the obstacle F due to the effect of the second preceding other vehicle T2 is estimated based on the detection result. Before the obstacle F is actually moved due to the effect of the second preceding other vehicle T2, the vehicle M performs the obstacle avoidance control, alert display, or alert notification based on the calculated estimated movement amount.

The traveling control apparatus 1 of this embodiment performs the obstacle avoidance control when the vehicle M including the traveling control apparatus 1 of this embodiment is traveling in the first lane 101 of the road 100 and the traveling control apparatus 1 has detected the obstacle F ahead on the road 100 and has detected multiple preceding other vehicles (T1, T2) ahead of the vehicle M in the adjacent lane (second lane 102).

According to this embodiment, the actual movement amount of the obstacle F due to the effect of the first preceding other vehicle T1 is detected and the detection result is stored. Therefore, it is possible to further improve the accuracy of estimation of the movement amount of the obstacle F due to the effect of the second preceding other vehicle T2 that follows the first preceding other vehicle T1.

Thus, it is possible to suppress traveling control that may cause the driver's discomfort, such as inappropriate or excessive avoidance control, and further reduce the possibility of collision with the obstacle F ahead.

The embodiment has been described above under the assumption that the vehicle M in the first lane 101 and the preceding other vehicles (T1, T2) in the adjacent lane (second lane 102) are traveling in the same direction (arrow S direction) as illustrated in FIG. 2. The obstacle avoidance control to be performed by the traveling control apparatus 1 according to the embodiment of the disclosure is not limited to the situation described above (situation of FIG. 2).

For example, the obstacle avoidance control is similarly applicable to a situation in which, on the road 100 illustrated in FIG. 2, the vehicle M is traveling in the second lane 102, the preceding other vehicles (T1, T2) are traveling in the adjacent first lane 101, and the vehicle M and the preceding other vehicles (T1, T2) are traveling in the same direction (arrow S direction).

Figure 4:
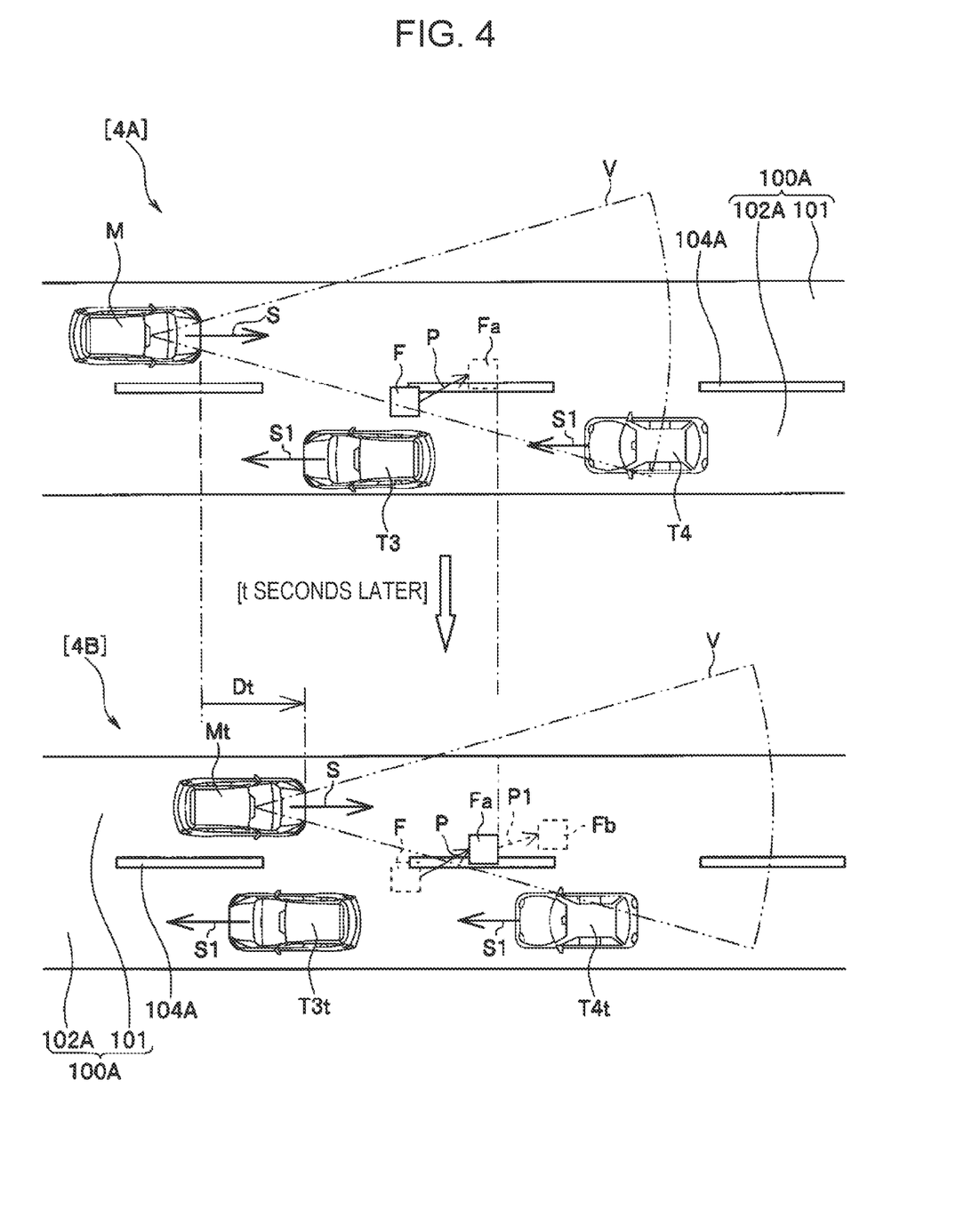
FIG. 4 is a conceptual diagram illustrating a second situation different from the situation of FIG. 2, in which the obstacle avoidance control is performed is performed by the traveling control apparatus according to the embodiment of the disclosure.

In a second situation of FIG. 4 that is different from the situation of FIG. 2, the obstacle avoidance control to be performed by the traveling control apparatus 1 of this embodiment may be performed substantially similarly to the situation of FIG. 2. The second situation of FIG. 4 is briefly described below.

The second situation of FIG. 4 is a conceptual situation in which the vehicle M and oncoming other vehicles (T3, T4) are traveling in opposite directions (arrow S direction and arrow S1 direction) on a general road 100A having two lanes on both sides.

Reference symbol [4A] in FIG. 4 represents traveling situations and surrounding situations of the vehicles (M, T3, T4) at a certain time. Reference symbol [4B] in FIG. 4 represents traveling situations and surrounding situations of the vehicles (M, T3, T4) after an elapse of a predetermined period (t seconds) from the situation [4A].

In FIG. 4, reference symbol 100A represents a road where the vehicle M and the oncoming other vehicles (T3, T4) are traveling. The road 100A has a current lane 101 where the vehicle M is traveling, and an oncoming lane 102A where the oncoming other vehicles (T3, T4) are traveling. The two lanes (101, 102A) are demarcated by a center line 104A.

The current lane 101 is referred to as "first lane". The oncoming lane 102A is referred to as "second lane". The first lane 101 and the second lane 102A adjoin each other.

The vehicle M includes the traveling control apparatus 1 of this embodiment. In the situation of FIG. 4, the vehicle M is traveling in the arrow S direction in the first lane 101. Reference symbol Mt in the situation [4B] of FIG. 4 represents the vehicle after the elapse of the predetermined period (t seconds) from the situation [4A] of FIG. 4.

During the predetermined period (t seconds) in which the situation changes from [4A] to [4B] in FIG. 4, the vehicle M moves in the arrow S direction by a distance indicated by an arrow Dt in FIG. 4. Similarly, the oncoming other vehicles (T3, T4) move in the arrow S1 direction by predetermined distances during the t seconds.

In FIG. 4, reference symbol V represents a conceptual visual field range (recognition range) of the stereo camera 11 in the camera unit 10 that may serve, in one embodiment, as a "surrounding environment recognition device" in the traveling control apparatus 1 of the vehicle M.

In the situation of FIG. 4, the oncoming other vehicles (T3, T4) are traveling toward the vehicle M from an area ahead of the vehicle M. In this case, the oncoming other vehicles (T3, T4) are traveling in the second lane 102 adjacent to the first lane 101 where the vehicle M is traveling.

In the oncoming other vehicles (T3, T4), the oncoming other vehicle T3 is a first other vehicle (hereinafter referred to as "first oncoming other vehicle T3") traveling ahead of the vehicle M and located near the obstacle F described later.

In the oncoming other vehicles (T3, T4), the oncoming other vehicle T4 is a second other vehicle (hereinafter referred to as "second oncoming other vehicle T4") traveling ahead of the vehicle M and behind the first oncoming other vehicle T3.

The traveling directions of the first oncoming other vehicle T3 and the second oncoming other vehicle T4 (arrow S1 direction) are opposite to that of the vehicle M (arrow S direction). Reference symbols T3*t* and T4*t* in the situation [4B] of FIG. 4 represent the first oncoming other vehicle and the second oncoming other vehicle after the elapse of the predetermined period (t seconds) from the situation [4A] of FIG. 4.

An object that may hinder the traveling of the vehicle M, the first oncoming other vehicle T3, and the second oncoming other vehicle T4 (obstacle F) is present ahead of the vehicle M, the first oncoming other vehicle T3, and the second oncoming other vehicle T4 on the road 100A.

In the situation [4A] of FIG. 4, the first oncoming other vehicle T3 traveling ahead out of the multiple oncoming other vehicles (T3, T4) passes by the obstacle F while avoiding collision with the obstacle F. At this time, the obstacle F is moved due to an effect of the first oncoming other vehicle T3 (for example, an air pressure caused during the passage by the obstacle F).

For example, in the situation [4B] of FIG. 4 (after the elapse of the predetermined period (t seconds)), the obstacle F is moved in an arrow P direction to a position Fa from the initial position (position represented by reference symbol F in the situation [4A]).

When the obstacle F is moved by a predetermined movement amount due to the effect of the first oncoming other vehicle T3, the traveling control apparatus 1 of the vehicle M detects the movement amount of the obstacle F (see Step S4 of FIG. 3).

As described above, the second oncoming other vehicle T4 is following the first oncoming other vehicle T3 in the adjacent lane (second lane 102A). Therefore, the second oncoming other vehicle T4 is approaching the moved obstacle F (at the position Fa).

The second oncoming other vehicle T4 is also expected to pass by the moved obstacle F at the position Fa while avoiding collision with the obstacle F. At this time as well, the obstacle F can be predicted to move due to an effect of the second oncoming other vehicle T4.

For example, the obstacle F is predicted to move in an arrow P1 direction by a predetermined distance to an estimated position (reference symbol Fb) from the position Fa in the situation [4B] of FIG. 4 due to the effect of the second oncoming other vehicle T4.

In this case, the estimated movement amount of the obstacle F due to the effect of the second oncoming other vehicle T4 can be calculated based on the detected movement amount of the obstacle F due to the effect of the first oncoming other vehicle T3.

The calculated estimated movement amount is subjected to the correction arithmetic process based on the surrounding environment conditions. Thus, a more highly accurate corrected estimated movement amount is calculated.

The obstacle avoidance control is performed for the estimated position Fb of the obstacle F based on the estimated movement amount corrected by calculation. Thus, the control illustrated in the flowchart of FIG. 3 can be applied to the situation of FIG. 4 similarly to the situation of FIG. 2. In this case, similar effects can be attained.

The embodiment of the disclosure is not limited to the embodiment described above, and various modifications and applications may be made without departing from the gist of the disclosure. The embodiment includes various aspects of the disclosure that may be extracted by any appropriate combination of the disclosed constituent elements. For example, some of the constituent elements in the embodiment may be omitted as long as the problems described above can be solved and the effects described above can be attained. The constituent elements of different embodiments may be combined as appropriate. The embodiment of the disclosure is limited to the appended claims but not limited to specific modes of implementation.

According to the embodiment of the disclosure, it is possible to provide the vehicle traveling control apparatus that can start the obstacle avoidance control earlier by predicting, with high accuracy, the movement amount (for example, a movement distance and a movement direction) of an obstacle recognized ahead of the traveling vehicle, thereby suppressing inappropriate or excessive emergency avoidance control and reducing the possibility of collision between the vehicle and the obstacle.

The traveling ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle traveling control apparatus to be applied to a vehicle, the vehicle traveling control apparatus comprising:
  a surrounding environment recognition device comprising
    at least one of a sensor or a camera, the surrounding environment recognition device being configured to recognize a surrounding environment around the vehicle and acquire surrounding environment information on the vehicle; and
  one or more processors; and
  one or more memories storing instructions for causing the one or more processors to perform traveling control on the vehicle based on the surrounding environment information acquired by the surrounding environment recognition device, the instructions comprising:
  in response to detecting of (i) an obstacle expected to hinder traveling of the vehicle located ahead of the vehicle, (ii) a first other vehicle traveling ahead of the vehicle located in an adjacent lane that is adjacent to a traveling lane where the vehicle is traveling, and (iii) a second other vehicle following the first other vehicle in the adjacent lane, detecting a movement amount of the obstacle that is moved due to an effect of the first other vehicle, the effect being an air pressure caused during a passage of the first other vehicle by the obstacle;
  calculating, based on the detected movement amount of the obstacle caused by the effect of the first other vehicle, an estimated movement amount of the obstacle that is moved due to an effect of the second other vehicle, the effect being an air pressure caused during a passage of the second other vehicle by the obstacle, and
  performing the traveling control on the vehicle based on the estimated movement amount of the obstacle caused by the effect of the second other vehicle.

2. The vehicle traveling control apparatus according to claim 1, wherein the one or more processors are further caused to perform an arithmetic process for correcting the estimated movement amount of the obstacle by the effect of the second other vehicle based on the surrounding environment information acquired by the surrounding environment recognition device.

3. The vehicle traveling control apparatus according to claim 1, wherein the first other vehicle and the second other vehicle are traveling ahead of the vehicle in a same direction as a direction in which the vehicle is traveling.

4. The vehicle traveling control apparatus according to claim 1, wherein the first other vehicle and the second other vehicle are traveling ahead of the vehicle in a direction opposite to a traveling direction in which the vehicle is traveling.

5. The vehicle traveling control apparatus according to claim 1, wherein the obstacle is at least one of a fallen object or an airborne object.

6. The vehicle traveling control apparatus according to claim 1, the movement amount of the obstacle comprises a movement distance and a movement direction of the obstacle.

7. The vehicle traveling control apparatus according to claim 1, wherein the one or more processors detect the movement amount of the obstacle that is moved due to the effect of the first other vehicle during a predetermined period.

8. The vehicle traveling control apparatus according to claim 1, wherein the one or more processors perform the traveling control on the vehicle based on the estimated movement amount before the obstacle is moved due to the effect of the second other vehicle.

9. A vehicle traveling control apparatus to be applied to a vehicle, the vehicle traveling control apparatus comprising:
  a surrounding environment recognition device comprising at least one of a sensor or a camera, the surrounding environment recognition device being configured to recognize a surrounding environment around the vehicle and acquire surrounding environment information on the vehicle; and
  one or more processors; and
  one or more memories storing instructions for causing the one or more processors to perform traveling control on the vehicle based on the surrounding environment information acquired by the surrounding environment recognition device, the instructions comprising:
  in response to detecting of (i) an obstacle expected to hinder traveling of the vehicle located ahead of the vehicle, (ii) a first other vehicle traveling ahead of the vehicle located in an adjacent lane that is adjacent to a traveling lane where the vehicle is traveling, and (iii) a second other vehicle following the first other vehicle in the adjacent lane, detecting a movement amount of the obstacle that is moved due to an effect of the first other vehicle, the effect being an air pressure caused during a passage of the first other vehicle by the obstacle;
  calculating, based on the detected movement amount of the obstacle caused by the effect of the first other vehicle, an estimated movement amount of the obstacle that is moved due to an effect of the second other vehicle, the effect being an air pressure caused during a passage of the second other vehicle by the obstacle; and
  performing the traveling control on the vehicle based on the estimated movement amount;
  wherein the one or more memories further store instructions for causing the one or more processors to perform an arithmetic process for correcting the estimated movement amount based on the surrounding environment information acquired by the surrounding environment recognition device and one or more of conditions comprising:
  a difference between a vehicle speed of the first other vehicle and a vehicle speed of the second other vehicle;
  a difference between a separation distance of the first other vehicle and the obstacle and a separation distance of the second other vehicle and the obstacle; and
  a difference between a body size of the first other vehicle and a body size of the second other vehicle.

10. The vehicle traveling control apparatus according to claim 9, wherein the first other vehicle and the second other vehicle are traveling ahead of the vehicle in a same direction as a direction in which the vehicle is traveling.

11. The vehicle traveling control apparatus according to claim 9, wherein the first other vehicle and the second other vehicle are traveling ahead of the vehicle in a direction opposite to a traveling direction in which the vehicle is traveling.

12. The vehicle traveling control apparatus according to claim 9, wherein the effect of the first other vehicle is an air pressure caused during a passage of the first other vehicle by the obstacle, and the effect of the second other vehicle is an air pressure caused during a passage of the second other vehicle by the obstacle.

13. The vehicle traveling control apparatus according to claim 9, wherein the obstacle is at least one of a fallen object or an airborne object.

14. The vehicle traveling control apparatus according to claim 9, wherein the one or more processors perform the traveling control on the vehicle based on the estimated movement amount before the obstacle is moved due to the effect of the second other vehicle.

15. A vehicle traveling control apparatus to be applied to a vehicle, the vehicle traveling control apparatus comprising:
  components comprising a sensor or a camera; and
  circuitry configured to together with the components, recognize a surrounding environment around the vehicle and acquire surrounding environment information on the vehicle, perform traveling control on the vehicle based on the acquired surrounding environment information, in response to detecting of (i) an obstacle expected to hinder traveling of the vehicle located ahead of the vehicle, (ii) a first other vehicle traveling ahead of the vehicle located in an adjacent lane that is adjacent to a traveling lane where the vehicle is traveling, and (iii) a second other vehicle following the first other vehicle in the adjacent lane, detect a movement amount of the obstacle that is moved due to an effect of the first other vehicle, the effect being an air pressure caused during a passage of the first other vehicle by the obstacle, calculate, based on the detected movement amount of the obstacle caused by the effect of the first other vehicle, an estimated movement amount of the obstacle that is moved by an effect of the second other vehicle, the effect being an air pressure caused during a passage of the second other vehicle by the obstacle, and perform the traveling control on the vehicle based on the estimated movement amount of the obstacle caused by the effect of the second other vehicle.

16. The vehicle traveling control apparatus according to claim 15, wherein the first other vehicle and the second other vehicle are traveling ahead of the vehicle in a same direction as a direction in which the vehicle is traveling.

17. The vehicle traveling control apparatus according to claim 15, wherein the first other vehicle and the second other vehicle are traveling ahead of the vehicle in a direction opposite to a traveling direction in which the vehicle is traveling.

18. The vehicle traveling control apparatus according to claim 15, wherein the obstacle is at least one of a fallen object or an airborne object.

19. The vehicle traveling control apparatus according to claim 15, wherein the circuitry performs the traveling control on the vehicle based on the estimated movement amount before the obstacle is moved due to the effect of the second other vehicle.

* * * * *